(12) United States Patent
Kelley, II

(10) Patent No.: US 8,920,714 B2
(45) Date of Patent: Dec. 30, 2014

(54) CORROSION INHIBITING SELF-EXPANDING FOAM

(71) Applicant: U.S. Army Research Laboratory Attn: RDRL-LOC-I, Adelphi, MD (US)

(72) Inventor: John V. Kelley, II, Bel Air, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 100 days.

(21) Appl. No.: 13/668,366

(22) Filed: Nov. 5, 2012

(65) Prior Publication Data

US 2014/0023553 A1    Jan. 23, 2014

Related U.S. Application Data

(60) Provisional application No. 61/555,498, filed on Nov. 4, 2011.

(51) Int. Cl.

| C23F 11/00 | (2006.01) |
|---|---|
| C23F 11/02 | (2006.01) |
| C02F 5/02 | (2006.01) |
| B08B 9/00 | (2006.01) |
| B08B 3/00 | (2006.01) |
| C08G 18/40 | (2006.01) |
| C08J 9/14 | (2006.01) |
| C08G 101/00 | (2006.01) |

(52) U.S. Cl.
CPC ............. *C23F 11/02* (2013.01); *C08J 2375/04* (2013.01); *C08G 2101/0025* (2013.01); *C08G 18/40* (2013.01); *C08G 2150/90* (2013.01); *C08J 9/144* (2013.01)
USPC ....... 422/7; 422/9; 422/14; 422/17; 134/22.1; 134/26; 252/175; 252/372; 252/387

(58) Field of Classification Search
CPC ........................................................ C23C 4/00
USPC ......... 422/7, 9, 14, 17; 134/22.1, 26; 252/175, 252/372, 387
See application file for complete search history.

(56) References Cited

U.S. PATENT DOCUMENTS

| 2,976,248 A * | 3/1961 | Otrhalek ........................ 510/219 |
|---|---|---|
| 5,391,686 A | 2/1995 | Jadhav et al. |
| 5,393,457 A | 2/1995 | Miksic et al. |
| 6,218,442 B1 | 4/2001 | Hilborn et al. |
| 6,273,144 B1 | 8/2001 | Bohon et al. |
| 6,485,549 B1 | 11/2002 | Novak et al. |
| 6,809,160 B2 | 10/2004 | Tsuboniwa et al. |
| 2002/0026078 A1* | 2/2002 | Tokumoto et al. ............. 564/291 |

* cited by examiner

*Primary Examiner* — Monzer R Chorbaji
(74) *Attorney, Agent, or Firm* — John H. Raubitschek; Robert Thompson

(57) ABSTRACT

A corrosion prevention and control composition and method comprises combining primarily two-component polyurethane foam formed by reacting polyols with an isocyanate compound, and a 2 to 10 percent by weight of either an organic or inorganic gas-phase corrosion inhibitor. The closed cell foam provides a barrier protection for the underlying corrodible surface, while the inhibitor protects the metal from the absorbed moisture vapor, thereby preventing corrosion from occurring at the foam/metal interface. The resulting foam and inhibitor composition maintains better adhesion to the underlying corrodible structure in corrosive environments.

16 Claims, 2 Drawing Sheets

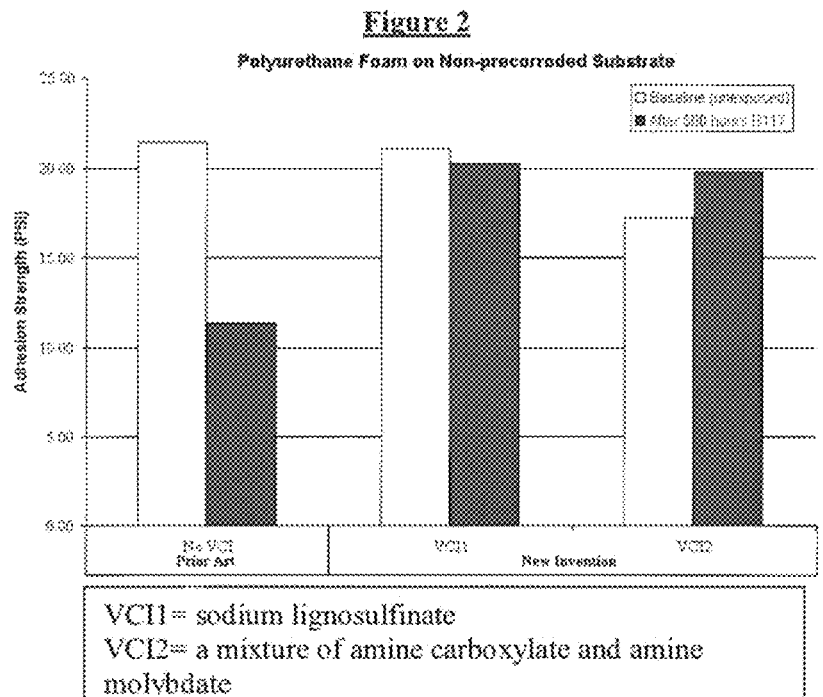

CORROSION INHIBITING SELF-EXPANDING FOAM

This application depends from and claims priority to U.S. Provisional Application No. 61/555,498 filed 4 Nov. 2011, the entire disclosure of which is incorporated herein by reference in its entirety.

GOVERNMENTAL INTEREST

The disclosed invention was made with U.S. Government support by the Army Research Laboratory. The invention may be manufactured, used, sold, imported or licensed by or for the United States Government without the payment of royalties.

BACKGROUND

Brief Description

The present invention generally relates to corrosion protection and prevention, and more particularly to a corrosion inhibiting self-expanding foam system for use, for example, in hollow corrodible structures and other applications.

Surfaces such as metal and other corrodible surfaces are often exposed to extreme weathering, temperatures, moisture, impurities, and otherwise damaging external forces, which accelerate corrosion. Conventional methods of corrosion protection include applying paints and other coatings, such as petroleum-based under-coatings, with a sprayer to the exposed surface. To be effective, the entire exposed surface must be covered or the corrosion process will be accelerated at the unprotected areas. While open area surfaces may be easier to protect, those surfaces found in internal cavities within an overall framework can be more challenging to protect. Achieving full coverage on internal surfaces can be extremely difficult, and in some cases impossible without drilling several access openings in the structure. However, these extraneous openings can compromise the strength of the structure as well as create more entryways for water and debris and the opportunity for corrosion to initiate at the edges of the openings.

Another method for protecting enclosed surfaces from corrosion is by using vapor phase corrosion inhibitors (VCI). Under atmospheric corrosion conditions, the method consists of saturating an enclosed surface with chemical vapors that enhance the corrosion resistance of the metal surface. Vapor phase corrosion inhibitors are typically used for corrosion prevention of "sealed" hollow structures, but have been used in some paint formulations. Corrosion inhibiting pigments in paint primers provide protection by reacting with the absorbed moisture vapor to passivate the metal surface to reduce its corrosive characteristics. Vapor phase corrosion inhibitors aim to protect the metal surfaces primarily by changing the kinetics of the corrosion reaction without adversely affecting the material properties of the metal itself. However, gas phase corrosion inhibitors offer no "barrier" protection because if the surfaces being protected are not completely enclosed from all sides, the inhibitors can be easily washed away with the introduction of water, etc., and the protection will be short lived.

Self-expanding foams have been used for a number of applications, the most common use being for thermal and noise insulation of homes, industrial and metal roofing, pipelines, and automobiles. These foams have also been used for watercraft floatation and packaging (padding) material for shipping fragile electronic components. Additionally, these foams have been used as another method of protecting enclosed surfaces from corrosion, wherein the foam is applied to the metal surface to provide protection from foreign elements. However, when used to fill and seal hollow metal structures against corrosives, the foam is deficient in that it is permeable by moisture vapor, which causes further degradation to its overall adhesion strength to the underlying surface. Thus, although some foam have low moisture absorption and good initial adhesion properties, water vapor can penetrate the foam and cause corrosion at the foam/metal interface. Moreover, once corrosion begins, the adhesion of the foam to the metal surface degrades and the seal is oftentimes broken, thereby allowing other corrosives to enter, destroying the metal surface. This results in a disadvantageous structure, which has an abbreviated useful life.

Therefore, there remains a need for a process and a corrosion inhibiting composition which provides corrosion protection, for example, to underlying metal (corrodible) parts, and structures, which are difficult to access for corrosion protection. Moreover, there remains a need for a singular corrosion inhibiting composition which is protected from being washed away, and which results in improved adhesion qualities between it and the underlying corrodible surface to allow for maximized corrosion protection, thereby overcoming the deficiencies of the prior art methods and systems.

SUMMARY

In view of the foregoing, embodiments of the invention provide a corrosion protection composition comprising a self-expanding polyol foam and a vapor-phase corrosion inhibitor. The self-expanding foam comprises a first and a second component, wherein the first component comprises an isocyanate compound or a cyanate ion (—NCO) containing compound, and wherein the second component comprises a polyol composition further comprising a blowing agent, a catalyst, a surfactant, and a fire retardant component. Polyol (a primary part of the "second component" or "resin blend") is typically based on mixtures of organic polyhydroxyl compounds having an OH number of about 10 to about 6233, more particularly from about 50 to about 1800. The polyols may have a nominal molecular weight average ranging from about 18 to about 10,000, more particularly from about 18 to about 6000 and most particularly from about 90 to about 6000. The polyols have a hydroxyl functionality of from about 2 to about 8, more particularly from about 2 to about 6. The polyhydroxyl compounds may, for example, comprise polyether polyols or mixtures of such polyether polyols known from polyurethane chemistry.

The polyols may have primary hydroxyl groups, secondary hydroxyl groups or a mixture of primary and secondary hydroxyl groups. Further, the polyols may be partially or completely capped with ethylene oxide or propylene oxide to alter the reactivity of the polyols or to increase the molecular weight of the polyols.

In embodiments, the two primary types of polyols used in preparing polyurethanes include polyethers, polyesters, and the like.

Polyethers have a relatively low molecular weight in the range of from about 500 to about 3000 and are manufactured from propylene oxide (PO) and ethylene oxide (EO). propylene oxide is the major constituent of the polyol mixture, whereas ethylene oxide is only included in small amounts to modify the properties of the polyol. The functionality of the polyether polyol (number of active hydroxyl groups per molecule) can be varied and has a value, for example, of 2 for elastomers, approximately 3 for flexible foams and up to 6 or more for rigid foams.

Polyether polyols include, but are not limited to, the ethoxylation and/or propoxylation products of the from two (2) to the eight (8) functional starter molecules such as, for example, water, ethylene glycol, 1,2-dihydroxy propane, trimethylol propane, diethylene glycol, triethylene glycol, dipropylene glycol, pentaerythritol, glycerol, sorbitol, sucrose, ethylene diamine, polytetramethylene glycol and butylene oxide based polyols. Suitable mixtures of this kind may be obtained, for example, by subjecting mixtures of starter molecules of the type mentioned above as examples to an ethoxylation and/or propoxylation reaction. Alternatively, polyhydroxyl polyethers which have been prepared separately may subsequently be mixed together to form the polyol component according to embodiments of the present invention.

Polyols used in the manufacture of the foaming composition may comprise aromatic amino-based polyether polyols, for example, those based on mixtures of 2,4- and 2,6-toluenediamine condensed with ethylene oxide and/or propylene oxide. These polyols may, for example, find utility in pour-in-place molded foams. Another example is the aromatic alkylamino-based polyether polyols such as those based on ethoxylated and/or propoxylated aminoethylated nonylphenol derivatives. These polyols generally find utility, for example, in spray applied polyurethane foams.

The polyester polyols are typically produced by the condensation reaction of a diol such as ethylene glycol with a dicarboxylic acid. Polyester polyols tend to be more expensive, are usually more viscous and difficult to handle but develop polyurethanes with superior tensile, abrasion, flexing and oil resistance properties. Consequently they may be used, for example, to make polyurethanes for more demanding applications. A disadvantage of polyester based polyurethanes is their lower hydrolysis resistance.

Polyester polyols may also be obtained by the reaction of polyhydric alcohols with polybasic carboxylic acids such as adipic acids, dimethyl terephthalate, phthalic acid and/or phthalic acid anhydride. These polyester polyols typically have a molecular weight average of from about 400 to about 4000. The polyol components may also contain small quantities of water in an amount of up to about two (2) percent by weight.

Typical polyols used in the manufacture of flexible polyurethane foams include, but are not limited to, those based on glycerol, ethylene glycol, trimethylolpropane, ethylene diamine, pentaerythritol, and the like condensed with ethylene oxide, propylene oxide, butylene oxide, and the like. These are generally referred to as "polyether polyols". Another example is the graft copolymer polyols which include, but are not limited to conventional polyether polyols with vinyl polymer grafted to the polyether polyol chain. Yet another example comprises polyurea modified polyols which consist of conventional polyether polyols with polyurea particles dispersed in the polyol.

In embodiments, the isocyanate can react with different chemical groups, so the final properties of the polymer will vary according to the reaction route taken. The production of consistent end products depends on mixing, in precise ratio, the ingredient chemicals and maintenance of the appropriate processing temperatures. As the liquid isocyanate and polyol react to form polyurethane, the liquid mix becomes increasingly viscous eventually forming a solid mass. The reaction is exothermic and heat is produced. Other ingredients will be included in the polyol blend, for example the catalyst which controls the rate at which the liquid mixture reacts to become solid.

The foaming compositions that are produced in embodiments can vary in density from about 0.5 pound per cubic foot to about 40 pounds per cubic foot, more particularly from about 1.0 to about 20.0 pounds per cubic foot, and most particularly from about 1.5 to about 6.0 pounds per cubic foot for rigid polyurethane foams and from about 1.0 to about 4.0 pounds per cubic foot for flexible foams. The density obtained is a function of how much of the blowing agent, or blowing agent mixture, of the invention is present in the components, or that is added at the time the foam is prepared. Two processes for forming polyurethanes have often been referred to either as a "one component" process or as a "two component" process.

(1) One Component System—In a one component system, a specially prepared prepolymer is allowed to undergo a chain reaction and cure in the presence of water vapor, often referred to as "moisture curing". Another process is to have a specially prepared prepolymer exposed to an amine atmosphere, such as diamines or triamines, often referred to as "vapor curing".

(2) Two Component System—In a two component system, the polyol is first mixed with fillers, plasticizers, catalysts and flame retardants to form a "resin" component, and this "resin component" is then mixed and reacted with the isocyanate, diisocyanate, polyisocyanate, or other constituents.

The isocyanate or polyisocyanate composition comprises the first component. The polyol or polyol mixture, surfactant, catalysts, blowing agents, flame retardant, water and other isocyanate reactive components comprise the second component. While the surfactant and fluorocarbon blowing agent are usually placed on the polyol side, they may be placed on either side, or partly on one side and partly on the other side. Accordingly, polyurethane or polyisocyanate foams are readily prepared by bringing together the first and second side components either by hand mix, for small preparations, or, for example, machine mix techniques to form blocks, slabs, laminates, pour-in-place panels and other items, spray applied foams, froths, and the like.

The term polyisocyanate as used herein refers to any isocyanate having an average functionality greater than or equal to about 2.0. One example of a polyisocyanate first side component used in producing polyurethane are diphenylmethane diisocyanates or derivatives of these polyisocyanates which may contain carbodiimide, biuret, urethane, isocyanurate, allophanate groups, and mixtures of compounds having these groups, and are liquid at room temperature. Other examples of include organic polyisocyanates including, but not limited to, aromatic polyisocyanates, aliphatic polyisocyanates, prepolymers formed from aromatic or aliphatic polyisocyanates and mixtures thereof. Another example of a polyisocyanate for producing a rigid or closed-cell polyurethane foam are polymethylene polyphenyl isocyanates, particularly the mixtures containing from about 30 to about 85 percent by weight of methylenebis(phenyl isocyanate) with the remainder of the mixture comprising polymethylene polyphenyl polyisocyanates of functionality higher than 2. The methylene diphenyl diisocyanates (MDI) are one of the most widely used polyisocyanates with a functionality of about 2.0

Another example of a polyisocyanate for the preparation of a polyurethane elastomer is exemplified by a 4,4'-diphenylmethane diisocyanate having an average functionality of about 2.1.

In embodiments polyisocyanates for rigid polyurethane or polyisocyanurate foam synthesis are the polymethylene polyphenyl isocyanates, particularly the mixtures containing from about 30 to about 85 percent by weight of methylene bis(phenyl isocyanate) with the remainder of the mixture comprising the polymethylene polyphenyl polyisocyanates of functionality higher than two (2).

Low-density water blown polyurethane foams may be prepared by mixing the polyisocyanate first component, the polyol second component or both in the diluent. Alternatively, the diluent may be co-injected as a separate component into conventional equipment that will mix the diluent and the other components of the reaction mixture. The mixture of the diluent and the other foaming composition components typically has a lower viscosity than the polyisocyanate or polyol component. Water is added to the polyol second component in an amount calculated to provide the desired amount of carbon dioxide to act as a blowing agent. Polyols are hygroscopic, so the amount of water present in the polyol is typically measured and taken into account in calculating the amount of water to be added, such that the total amount of water needed will be the sum of the water present in the polyol and the water added to the second component. The polyisocyanate, polyol and water may be mixed by known methods including, but not limited to, static mixers. The polyurethane reaction mixture will form polyurethane with the carbon dioxide acting as a blowing agent to cause the polyurethane to form a foam structure.

Water blown closed-cell, low-density rigid polyurethane foams made using known formulations generally have poor dimensional stability. Prior art prepared water blown, closed-cell, low density polyurethane foams generally shrink and/or collapsed over a period of time ranging from hours to months. The water blown closed cell, low density polyurethane foams use carbon dioxide, and are formed by the in situ reaction between water and a portion of the polyisocyanate present, to cause the reacting polymer mixture to foam. After the polyurethane foam is fully formed, the carbon dioxide may diffuse out of the closed cells faster than air can diffuse into the cells, creating a vacuum. The resulting pressure differential causes the foam to shrink and/or collapse. Surprisingly, the use of a diluent in the polyurethane forming reaction mixture permits the formation of water blown, closed-cell rigid foams with improved dimensional stability. In embodiments, the foams have a closed-cell content of greater than about 50 percent, more particularly greater than about 70 percent and in further embodiments, greater than about 80 percent.

Flexible or open-cell polyurethane foams are often manufactured using an excess of diisocyanate that reacts with water, included as a raw material, producing gaseous carbon dioxide and causing foam expansion. The flexible foams are widely used as cushioning materials in items such as furniture, bedding, and automobile seats. Additional blowing agents such as methylene chloride and/or fluorocarbons and hydrochlorofluorocarbons are required in addition to the water/diisocyanate blowing mechanism in order to produce low density, soft grades of foam.

In embodiments, polyisocyanates for flexible polyurethane foam synthesis may be toluene diisocyanates comprising, 2,4-toluene diisocyanate, 2,6-toluene diisocyanate, and mixtures thereof. Further comprising p-phenylene diisocyanate; polymethylene polyphenylisocyanate; diphenyl-methane diisocyanate; m-phenylene diisocyanate; hexamethylene diisocyanate; butylene-1,4-diisocyanate; octamethylene diisocyanate; 3,3'-dimethoxy-4,4'-biphenylene diisocyanate; 1,18-octadecamethylene diisocyanate; polymethylene diisocyanate; benzene triisocyanate; naphthylene-2,4-diisocyanate; 3,3'-dimethyl-4,4'-biphenylene diisocyanate; 1-methoxy phenylene-2,4-diisocyanate; diphenylene-4,4'-diisocyanate; 4,4'-diisocyanate diphenyl ether; naphthylene-1,5-diisocyanate; diisocyanate-dicyclohexyl-methane; p-xylylene diisocyanate; xylylene diisocyanate; hydrogenated diphenylene diisocyanate; hydrogenated diphenyl methane diisocyanate; toluene-2,4,6-triisocyanate; 3,-methyl-4,6,4'-triisocyanate diphenyl methane; 2,4,4'-triisocyanate diphenyl; and 2,4,4'-triisocyanate diphenyl ether, and mixtures thereof.

Additionally, and in embodiments, the corrosion inhibitor comprises from about 2 percent to about 10 percent by weight of the overall corrosion protection material prior to mixing.

Other embodiments comprise a method of inhibiting corrosion on a corrosive surface, wherein the method comprises combining a barrier protection composition with a gas-phase corrosion inhibiting composition to create a self-expanding foam, and allowing the self-expanding foam to adhere to the corrosive surface, wherein the barrier protection composition comprises polyurethane, further wherein the barrier protection composition is formed by combining a first component with a second component, still further wherein the first component comprises any of an isocyanate compound and a cyanate ion (—NCO) containing compound, and wherein the second component comprises a polyol composition comprising a blowing agent, a catalyst, a surfactant, and a fire retardant component. In addition, the vapor-phase corrosion inhibiting composition comprises from about 2 percent to about 10 percent by weight of the self-expanding foam. Also, the gas-phase corrosion inhibiting composition comprises either organic compounds or inorganic compounds. In embodiments, the gas-phase corrosion inhibiting composition is combined with the second component prior to combining the second component with the first component.

The invention is novel in its ability to inhibit corrosion, thus maintaining better adhesion, and to seal out corrosives from the otherwise corrodible structures that are exposed to corrosive environments. Specifically, there are several distinct advantages of using the combination corrosion inhibiting polyurethane foam system and material composition provided by the invention over prior art and the spray-on type methods: 1) During the foam expansion phase, the foam propagates through the structure to fill inaccessible voids; 2) Once cured, the foam adheres to the walls of the structure and provides a seal from water intrusion; 3) The corrosion inhibitors are contained within the "sealed" structure and provide extended corrosion protection against the intrusion of water vapor; and 4) The foam prevents the corrosion inhibitors from being washed away. Thus, the invention is an advantageous process that provides the end user with a structure containing corrosion inhibitors and requires fewer access openings.

Furthermore, the foaming composition provided by embodiments of the invention is an insulating material having an R-value rating of R-7 per inch. Moreover, the foam provided by embodiments of the invention, for example, is applicable in building construction ceilings, walls, floors, tank insulation, boats, marine floatation, oil drilling rigs and camps, earthquake protection, roofing, duct work, cold storages, controlled atmosphere buildings, condensation control, and the like. Therefore, many of the current uses that include adhesion to metal will be enhanced by the added corrosion inhibiting quality of the foam provided by the invention. Moreover, the invention embodiments are also valuable for such commercial applications, for example, as automotive sound and thermal insulation, underground pipelines, hollow members of bridging structures, double-walled ocean going vessels, telecommunication towers, buoys, and military systems such as vehicle frame rails and interior cavities, rotary wing aircraft floor cavities, deployable combat engineer bridging assets, metal floatation devices, and others.

BRIEF DESCRIPTION OF THE DRAWINGS

The invention will be better understood from the following description of embodiments of the invention with reference to the drawings.

FIG. 2 is a graphical representation comparing the adhesion strength of an embodiment of the invention with that of other systems known in the art.

FIG. 3 is a flow diagram illustrating an embodiment of the invention.

DETAILED DESCRIPTION

Figure 1:
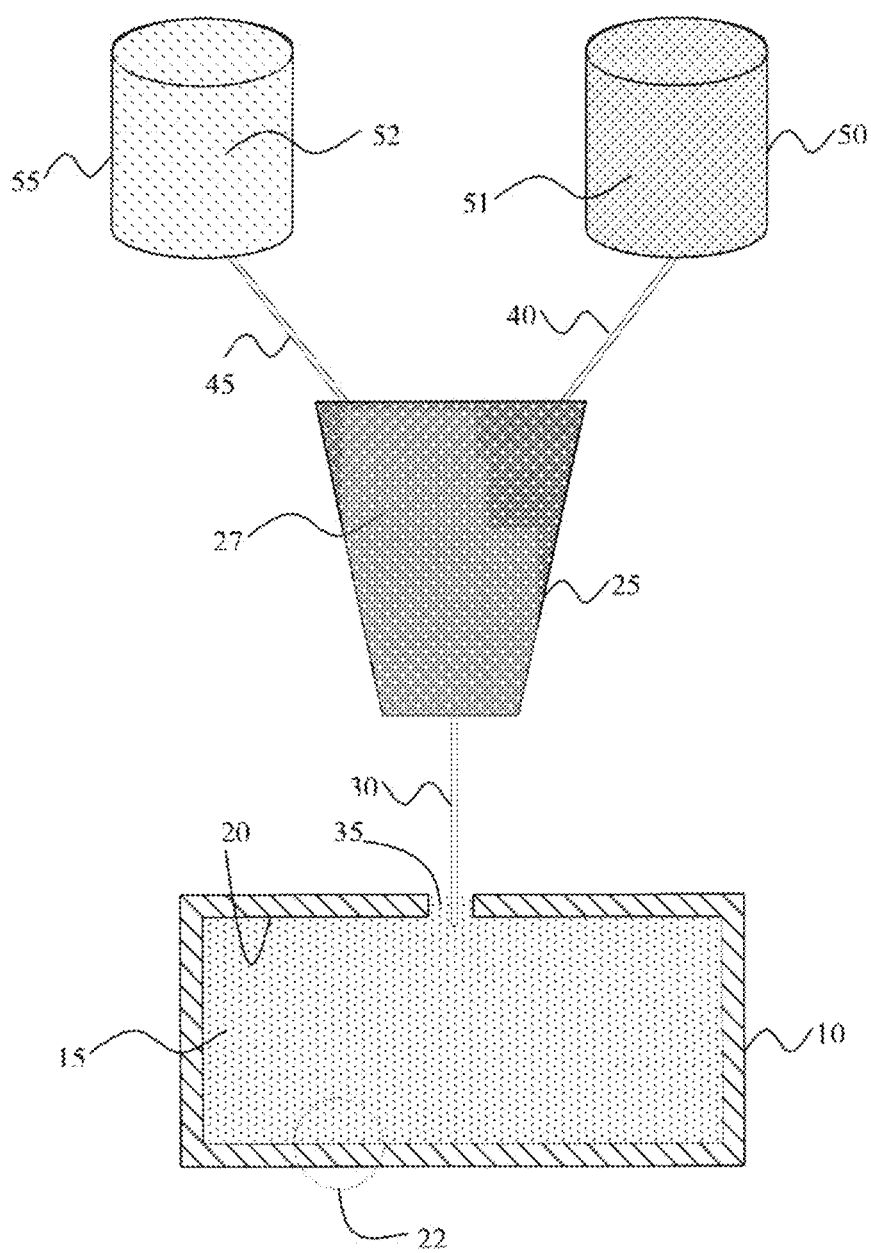
FIG. 1 is a schematic diagram of an enclosed corrodible structure comprising a foam and corrosion inhibitor composition according to an embodiment of the invention.

As previously mentioned, there is a need for novel corrosion inhibiting compositions that protect the surfaces of metal and other corrodible structures, which results in improved adhesion qualities between the corrosion inhibiting composition and the underlying corrodible surface in order to seal out corrosives and allow for maximized corrosion protection, and which overcomes the deficiencies of the prior art methods, systems, and compositions of corrosion protection.

Embodiments of the invention provide a corrosion prevention composition and method for use on structures. These structures may often contain voids that are inaccessible for conventional spray-on type corrosion prevention techniques such as paints, petroleum based corrosion inhibitors, and under coatings. Furthermore, very often water and other corrosives leak into these structures causing corrosion from the inside. Therefore, the invention provides a corrosion inhibiting self-expanding foam composition, which is designed to solve this problem because, as it expands, the foam propagates through the structure and delivers corrosion-inhibiting material throughout the structure and, once cured, the foam seals the structure from liquids and other corrosives.

Thus, the invention provides a barrier protection composition with a vapor-phase corrosion inhibiting composition to create a self-expanding foam. Referring now to the drawings, and more particularly to FIGS. 1 through 3, there are shown embodiments of the present invention.

As illustrated in FIG. 1, an embodiment of the invention is shown being used in a hollow corrodible structure 10 having an inner corrodible surface 20 and an access opening 35. Pressurized canisters 50, 55 are used for the storage or mixing of the various components of the foam composition. A first pressurized canister 55 stores a first component 52, which comprises an isocyanate or a cyanate ion (—NCO) containing compound. A second pressurized canister 50 stores a mixture 51 of a vapor-phase corrosion inhibitor and a polyol blend comprising a blowing agent, catalyst, surfactant, and fire retardant component. The corrosion inhibitor and polyol blend are combined in canister 50 to form composition 51 prior to pressurization. The pressure within the first and second canister may range from about twenty-five to about two hundred and fifty pounds per square inch (psi). The contents of canister 50, (i.e., the corrosion inhibitor and polyol blend mixture 51) and the contents of canister 55 (i.e., the isocyanate or a cyanate ion (—NCO) containing compound 52), in embodiments are then sent via nozzles/tubes 40, 45, respectively to a mixing chamber 25 where they are mixed resulting in a polyol/gas phase corrosion inhibitor mixture which creates a pre-expanded foam mixture 27. An access nozzle 30 provides extrusion means for the foam/corrosion inhibitor composition 27 to enter into the hollow structure 10 through the access opening 35, which then self-expands and propagates through the entire structure 10. Once cured, the compound 27 forms a cohesive foam 15, which provides barrier protection for the inner surface 20 of the hollow structure 10, including around the access opening 35. The result is a rigid closed cell foam 15 that resists water intrusion.

Thus, there are, in embodiments, two parts of the invention. First, there is a vapor phase corrosion inhibitor component and second, there is a polyurethane foam component. As described above and in embodiments, the polyol blend and the gas phase corrosion inhibitor are mixed together in canister 50 prior to the subsequent mixing with the first component 52, the isocyanate or a cyanate ion (—NCO) containing compound in the mixing chamber 25. In other embodiments, the mixing of the various components may occur in any reasonable manner which provides for proper mixing, dilution, and for proper chemical composition mixture and balance.

As mentioned, the first component 52, in embodiments comprises an isocyanate or a cyanate ion (—NCO) containing compound, and the second component may comprise a polyol blend comprising a blowing agent, catalyst, surfactant, and fire retardant component. More specifically, the isocyanate compound may, for example, comprise any of 2,4-tolylene diisocyanate; 2,6-tolylene diisocyanate; p-phenylene diisocyanate; polymethylene polyphenylisocyanate; diphenylmethane diisocyanate; m-phenylene diisocyanate; hexamethylene diisocyanate; butylene-1,4-diisocyanate; octamethylene diisocyanate; 3,3'-dimethoxy-4,4'-biphenylene diisocyanate; 1,18-octadecamethylene diisocyanate; polymethylene diisocyanate; benzene triisocyanate; naphthylene-2,4-diisocyanate; 3,3'-dimethyl-4,4'-biphenylene diisocyanate; 1-methoxy phenylene-2,4-diisocyanate; diphenylene-4,4'-diisocyanate; 4,4'-diisocyanate diphenyl ether; naphthylene-1,5-diisocyanate; diisocyanate-dicyclohexylmethane; p-xylylene diisocyanate; xylylene diisocyanate; hydrogenated diphenylene diisocyanate; hydrogenated diphenyl methane diisocyanate; toluene-2,4,6-triisocyanate; 3,-methyl-4,6,4'-triisocyanate diphenyl methane; 2,4,4'-triisocyanate diphenyl; 2,4,4'-triisocyanate diphenyl ether; or mixtures thereof.

The blowing agent may comprise trichlorofluoromethane, trichlorofluoroethane, dichloromonofluoromethane, monochloroethane, monochloromonofluoroethane, difluoromonochloroethane, difluorodichloroethane or mixtures thereof.

Catalysts have a key role in the foam composition production. Catalysts are required to maintain a balance between the reaction of the isocyanate and polyol. The two main classes of catalyst used, are the organometallics and the amines. The combination of very complex chemistry and diverse processing and molding conditions make great demands of the catalyst. The catalysts main function is to exploit the diverse reactions to create a product with the desired properties.

(1) Organometallic catalysts are used to accelerate the reaction and formation of urethane linkages and hence promote rapid curing.

Typical of such catalysts are organometallic compounds of lead, tin, titanium, antimony, cobalt, aluminum, mercury, zinc, nickel, copper, manganese, zirconium, and mixtures thereof. Exemplary catalysts include, without limitation, lead 2-ethylhexoate, lead benzoate, ferric chloride, antimony trichloride, and antimony glycolate. The organo-tin class of catalysts comprises the stannous salts of carboxylic acids such as stannous octoate, stannous 2-ethylhexoate, stannous laurate, and dialkyl tin salts of carboxylic acids such as dibutyl tin diacetate, dibutyl tin dilaurate, dioctyl tin diacetate, and the like.

Amines are another class of catalysts widely used in the making of polyurethane foams. Some amine catalysts promote crosslinking while others assist in controlling the foam's cell structure. Typical catalysts include tertiary amines including, but not limited to, N-alkylmorpholines, N-alkylalkanolamines. N,N-dialkylcyclohexylamines, and alkylamines where the alkyl groups are methyl, ethyl, propyl, butyl and the like and isomeric forms thereof, as well as hetrocyclic amines. Particular examples include triethylenediamine, tetramethylethylenediamine, bis(2-dimethylaminoethyl)ether, triethylamine, tripropylamine, tributylamine, triamylamine, pyridine, quinoline, dimethylpiperazine, piperazine, N,N-dimethylcyclohexylamine, N-ethylmorpholine, 2-methylpiperazine, N,N-dimethylethanolamine, tetramethylpropanediamine, methyltriethylenediamine, and mixtures thereof.

Adding a conventional catalyst or combination of conventional catalysts alters the rate of the foam formation. Catalysts for the isocyanate addition reaction include, but are not limited to, organic tin compounds such as tin (II) octoate, dibutyl tin dilaurate, or lead naphthenate (PbN); or tertiary amines such as N,N-dimethyl cyclohexylamine (DMCHA), 1,4-diazabicyclo[2.2.2]octane (TEDA) and 70 percent bis(dimethylaminoethyl)ether in DPG; or amine polyol catalysts such as 33 percent TEDA in glycol or dimethylethanolamine (DMEA); amine catalysts such as pentamethyldiethylenetriamine (PMDETA). These catalysts are, in embodiments, generally used in a quantity of up to about 4 percent by weight and in embodiments from about 0.3 percent to about 1 percent by weight, based on the total quantity of the foam forming composition.

As mentioned, if gas phase corrosion inhibitors alone are applied in an unsealed hollow structure, the inhibitors are consumed too quickly or washed away and the corrosion protection is short lived. Therefore, and in embodiments, the invention utilizes the foaming composition to confine the inhibitors as well as seal the inner surface 20 from water and other corrosives. Thus, the vapor phase corrosion inhibitors remain on the inner surface 20 longer and provide extended corrosion protection compared to conventional systems.

The following example demonstrates the effectiveness of using an organic (or inorganic) vapor-phase corrosion inhibitor in the self-expanding foam formulation provided by the invention.

Fire retardants, such as phosphorus and/or halogen containing molecules, are added to the foam formulations to meet certain flammability specifications and they are also used as mild plasticisers. Flame retardants such as tris(2-chloroethyl)phosphate, tris(2-chloropropyl)phosphate, tris(2,3-dibromopropyl)phosphate, tris(1,3-dichloropropyl)phosphate, diammonium phosphate, various halogenated aromatic compounds, antimony oxide, aluminum trihydrate, polyvinyl chloride, and the like. Other optional ingredients may include from about 0 to about 3 percent water, which chemically reacts with the isocyanate to produce carbon dioxide.

Chain extenders are reactive low molecular weight difunctional compounds such as hydroxylamines, glycols or diamines and may be used to influence the end properties of the polyol foam. The chain-extender reacts with the isocyanate to affect the hard/soft segment relationship and therefore the modulus and glass transition temperature (Tg) of the polymer. The glass transition temperature provides a measure of the polymer's softening point and some indication of the safe upper limit of its working temperature range.

Blowing agents are used to provide gas bubbles in the polyol reaction mixture that form gas bubbles in the reaction mixture as it polymerizes. They are usually low boiling point liquids which are volatilized by the heat generated by the exothermic reaction between the isocyanate and polyol.

Organic blowing agents include, but are not limited to, non-ozone depleting hydrofluorocarbons, non-ozone depleting hydrochlorofluorocarbons and aliphatic hydrocarbons comprising, for example, trichlorofluoromethane (CFC-11) and 1; 1-dichloro-1-fluoroethane (HCFC-141b) because of their ease of use in, the escape of certain chlorine constituents into the environment has mandated the use of other blowing agents. In view of the environmental concerns with respect to chlorofluorocarbon blowing agents, it is now generally accepted that it would be more desirable to use hydrochlorofluorocarbons (HCFCs) or hydrofluorocarbons (HFCs) rather than the chlorofluorocarbons. Exemplary hydrofluorocarbons suitable for use as blowing agents in the preparation of polyurethane and polyisocyanurate foams are 1,1,1,3,3-pentafluoropropane (HFC-245fa), 1,1,1,2-tetrafluoroethane (HFC-134a) and 1,1,2,2-tetrafluoroethane (HFC=134). These materials, however, possess a lower boiling point and a correspondingly higher vapor pressure than some other materials. Blowing agents may be used singly or in mixtures. The use of individual blowing agents or mixtures of blowing agents is determined by the desired properties of the polyol.

Other non-ozone depleting blowing agents include other hydrofluorocarbons such as difluoromethane (HFC-32), difluoroethane (HFC-152), trifluoroethane (HFC-143), tetrafluoroethane (HFC-134), pentafluoropropane (HFC-245), hexafluoropropane (HFC-236), heptafluoropropane (HFC-227); hydrocarbons such as butane, isobutane, n-pentane, isopentane, cyclopentane, hexane and isohexane; inert gases, e.g., air, nitrogen, carbon dioxide; and water in an amount of from about 0.5 to about 2 parts per 100 parts of polyol. Difluoroethane, trifluoroethane, tetrafluoroethane, heptafluoropropane and hexafluoropropane.

Hydrocarbon blowing agents, such as n-pentane, isopentane, and cyclopentane, do not deplete stratospheric ozone, but are extremely flammable. Foams expanded with a blowing agent composed only of hydrocarbons often require addition of expensive flame retardant materials to meet the regulations. Finally, hydrocarbon blowing agents are classified as Volatile Organic Compounds and present environmental issues associated with photochemical smog production in the lower atmosphere.

In embodiments, one approach is to use a mixture of one or more different hydrofluorocarbons ("HFCs") or hydrochlorofluorocarbons (HCFCs) or hydrofluorocarbons (HFCs) mixed with different hydrocarbons such as butane, isobutane, n-pentane, isopentane, cyclopentane, hexane and isohexane. This can be especially important where one component of the blowing agent is very flammable and the other component is nonflammable because minimizing fractionation during a leak or accidental spill minimizes the risk of producing extremely flammable mixtures.

As with other polymers the use of fillers will yield products with modified performance. Calcium carbonate and glass fibers are most commonly used. The former primarily to make cheaper formulations, the latter are of growing interest in reaction injection moulding (RIM) technology.

Inorganic fillers, like calcium carbonate and barium sulphate, can be used to extend certain formulations, but they may reduce many of the physical properties. Organic polymer dispersions in polyols can be used as reinforcing fillers, (these polyols are called "polymer polyols").

Additives can include a plurality of compounds, but all materials should be free of water so as to avoid invalidating stoichiometric calculations and/or inadvertent $CO_2$ formation.

Surfactants, such as silicones, are used to facilitate mixing and control cell structure in foams.

Plasticizers, such as phthalates, benzoates and aromatic oils can be used, here again physical properties are often reduced. Other widely used additives are dyes, pigments, solvents and blowing agents. Surfactants, better known as silicone oils, are added to serve as cell stabilizers.

EXAMPLE

In an example, a two (2) percent by weight concentration of an organic gas-phase corrosion inhibitor is added to the polyol blend component to form component 51. While a 2% solution is used in this example, an about 2 to about 10 percent solution may also be used. Because of the addition of the 2 percent gas phase corrosion inhibitor in this example, the two components of the foam (components 52 and 51) are then mixed in a 49:51 ratio, respectively, in canister 25 and once combined into a mixture 27 are injected into the hollow structure 10, where it is allowed to expand and cure into a solid foam structure 15. While the foam portion provides the barrier protection, the inhibitors protect the metal 20 from the absorbed moisture vapor by changing the kinetics of the corrosion reaction. Consequently, by preventing corrosion from occurring at the foam/metal interface 22, the foam 15 maintains better adhesion to the corrodible structure 20, which results in better sealing capabilities and better overall protection.

The adhesion tests were conducted using a modified version of the American Society for Testing and Materials (ASTM) 1002-99. The results of the tests shown in FIG. 2 illustrate the adhesion strength results of polyurethane foam on steel substrates that were not pre-corroded. As shown, the adhesion of the foam samples with no vapor phase corrosion inhibitor added (conventional methods) was reduced by nearly 47 percent after only 500 hours of ASTM B117 salt fog testing, which provides controlled atmospheric conditions. Conversely, and in embodiments, the polyurethane foam with the corrosion inhibitors as used in the invention clearly maintained better adhesion than the conventional composition after the 500 hours of salt fog exposure. In this example, two different gas phase corrosion inhibitors were tested, sodium lignosufinate and a mixture of amine carboxylate and amine molybdate.

As shown in FIG. 2, prior to the salt fog testing (Baseline (unexposed) portion of the graph), the conventional sample provided an adhesion strength of approximately 21.5 psi, while the samples using the invention's foam plus two (2) percent gas phase corrosion inhibitor composition yielded an adhesion strength of approximately 21.0 psi (sodium lignosufinate) and 17.0 psi (a mixture of amine carboxylate and amine molybdate), respectively. However, upon subjecting the samples to the salt fog environment, the adhesive strengths for the respective samples provided stark contrasting results. After exposure, the adhesion strength of the sodium lignosufinate and a mixture of amine carboxylate and amine molybdate samples maintained adhesion strengths of approximately 20.5 psi and 19.95 psi, respectively. By contrast, the drop off in the adhesive strength of the prior art sample was approximately 9.5 psi (from 21.5 psi down to 12.0 psi). Thus, as illustrated, the invention maintains its adhesion strength compared with the prior art compositions after exposure to ASTM B117 salt fog testing.

FIG. 3 illustrates an embodiment of the invention, where a method of inhibiting corrosion on a corrodible surface 20, such as metal, is illustrated. The method comprises combining 100 a barrier protection composition with a vapor-phase corrosion inhibiting composition to create a self-expanding foam 15, and allowing 200 the self-expanding foam 15 to adhere to the corrodible surface 20. The curing time for the self-expanding foam varies in embodiments from about three (3) to about ten (10) minutes.

As indicated, the prior art compositions do not provide adequate corrosion protection of the underlying corrodible surface, and as such those corrodible surfaces are subject to greater corrosion. Whereas, embodiments of the present disclosure, by combining a self-expanding foaming composition with corrosion inhibitors allows the underlying corrodible surface to be protected from all sides, and to ward off corrosive effects.

The foregoing description of specific embodiments reveals the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A corrosion protection composition comprising:
   (a) a self-expanding foam and a gas phase corrosion inhibitor in combination with said self-expanding foam;
   (b) wherein said self-expanding foam comprises a first component and a second component, and wherein said gas phase corrosion inhibitor is combined with said second component prior to combining with said first component;
   (c) further wherein said first component comprises a cyanate (—NCO) ion containing compound and an isocyanate compound, wherein the isocyanate compound comprises 2,4-tolylene diisocyanate; 2,6-tolylene diisocyanate; p-phenylene diisocyanate; polymethylene polyphenylisocyanate; diphenyl-methane diisocyanate; m-phenylene diisocyanate; hexamethylene diisocyanate; butylene-1,4-diisocyanate; octamethylene diisocyanate; 3,3'-dimethoxy-4,4'-biphenylene diisocyanate; 1,18-octadecamethylene diisocyanate; polymethylene diisocyanate; benzene triisocyanate; naphthylene-2,4-diisocyanate; 3,3'-dimethyl-4,4'-biphenylene diisocyanate; 1-methoxy phenylene-2,4-diisocyanate; diphenylene-4,4'-diisocyanate; 4,4'-diisocyanate diphenyl ether; naphthylene-1,5-diisocyanate; diisocyanate-dicyclohexyl-methane; p-xylylene diisocyanate; xylylene diisocyanate; hydrogenated diphenylene diisocyanate; hydrogenated diphenyl methane diisocyanate; toluene-2,4,6-triisocyanate; 3,-methyl-4,6,4'-triisocyanate diphenyl methane; 2,4,4'-triisocyanate diphenyl; 2,4,4'-triisocyanate diphenyl ether; and mixtures thereof;
   (d) further wherein said second component comprises a polyol compound, a blowing agent, a catalyst, a surfactant, and a fire retardant agent;
   (e) wherein said gas phase corrosion inhibitor comprises organic compounds, inorganic compounds and mixtures thereof; and
   (f) wherein said gas phase corrosion inhibitor comprises from about two (2) to about ten (10) percent by weight of said corrosion protection composition.

2. The corrosion protection composition of claim 1, wherein said self-expanding foam comprises polyurethane or polyethylene.

3. The corrosion protection composition of claim 1, wherein said gas phase corrosion inhibitor comprises sodium lignosulfinate, amine carboxylate, amine molybdate, and mixtures thereof.

4. The corrosion protection composition of claim 1, wherein said gas phase corrosion inhibitor consists of sodium lignosulfinate.

5. The corrosion protection composition of claim 1, wherein said gas phase corrosion inhibitor consists of amine molybdate, amine carboxylate, and mixtures thereof.

6. A corrosion inhibiting material comprising:
  (a) a self-expanding rigid polyurethane foam and an organic gas phase corrosion inhibitor in combination with said self-expanding rigid polyurethane foam;
  (b) wherein said self-expanding foam comprises a first component and a second component;
  (c) wherein said first component comprises a —NCO compound and an isocyanate compound, further wherein the isocyanate compound comprises 2,4-tolylene diisocyanate; 2,6-tolylene diisocyanate; p-phenylene diisocyanate; polymethylene polyphenylisocyanate; diphenyl-methane diisocyanate; m-phenylene diisocyanate; hexamethylene diisocyanate; butylene-1,4-diisocyanate; octamethylene diisocyanate; 3,3'-dimethoxy-4,4'-biphenylene diisocyanate; 1,18-octadecamethylene diisocyanate; polymethylene diisocyanate; benzene triisocyanate; naphthylene-2,4-diisocyanate; 3,3'-dimethyl-4,4'-biphenylene diisocyanate; 1-methoxy phenylene-2,4-diisocyanate; diphenylene-4,4'-diisocyanate; 4,4'-diisocyanate diphenyl ether; naphthylene-1,5-diisocyanate; diisocyanate-dicyclohexyl-methane; p-xylylene diisocyanate; xylylene diisocyanate; hydrogenated diphenylene diisocyanate; hydrogenated diphenyl methane diisocyanate; toluene-2,4,6-triisocyanate; 3,-methyl-4,6,4'-triisocyanate diphenyl methane; 2,4,4'-triisocyanate diphenyl; 2,4,4'-triisocyanate diphenyl ether; and mixtures thereof;
  (d) wherein said second component comprises a polyol composition comprising a blowing agent, a catalyst, a surfactant, and a fire retardant component;
  (e) wherein said organic gas phase corrosion inhibitor is combined with said second component prior to combining with said first component; and
  (f) further wherein said organic gas phase corrosion inhibitor comprises 2 to 10 percent by weight of said corrosion inhibiting material.

7. A corrosion inhibiting material according to claim 6 wherein said material is utilized in a marine environment.

8. A corrosion inhibiting material according to claim 6, wherein said organic gas phase corrosion inhibitor comprises sodium lignosulfinate, amine carboxylate and amine molybdate, and mixtures thereof.

9. A method of inhibiting corrosion on a surface, said method comprising:
  (a) combining a barrier protection composition with a gas-phase corrosion inhibiting composition to create a self-expanding foam; and
  (b) allowing said self-expanding foam to adhere to said corrodible surface.

10. The method of claim 9, wherein said barrier protection composition is formed by combining a first component with a second component, wherein said first component comprises an isocyanate compound and a cyanate ion (—NCO) containing compound, and wherein said second component comprises a polyol composition comprising a blowing agent, a catalyst, a surfactant, and a fire retardant component.

11. The method of claim 10, wherein said barrier protection composition second component polyol is polyurethane.

12. The method of claim 11, wherein said isocyanate compound comprises 2,4-tolylene diisocyanate; 2,6-tolylene diisocyanate; p-phenylene diisocyanate; polymethylene polyphenylisocyanate; diphenyl-methane diisocyanate; m-phenylene diisocyanate; hexamethylene diisocyanate; butylene-1,4-diisocyanate; octamethylene diisocyanate; 3,3'-dimethoxy-4,4'-biphenylene diisocyanate; 1,18-octadecamethylene diisocyanate; polymethylene diisocyanate; benzene triisocyanate; naphthylene-2,4-diisocyanate; 3,3'-dimethyl-4,4'-biphenylene diisocyanate; 1-methoxy phenylene-2,4-diisocyanate; diphenylene-4,4'-diisocyanate; 4,4'-diisocyanate diphenyl ether; naphthylene-1,5-diisocyanate; diisocyanate-dicyclohexyl-methane; p-xylylene diisocyanate; xylylene diisocyanate; hydrogenated diphenylene diisocyanate; hydrogenated diphenyl methane diisocyanate; toluene-2,4,6-triisocyanate; 3,-methyl-4,6,4'-triisocyanate diphenyl methane; 2,4,4'-triisocyanate diphenyl; 2,4,4'-triisocyanate diphenyl ether; or mixtures thereof.

13. The method of claim 9, wherein said gas-phase corrosion inhibiting composition comprises from about 2 to about 10 percent by weight of said self-expanding foam.

14. The method of claim 9, wherein said gas-phase corrosion inhibiting composition comprises organic compounds.

15. The method of claim 9, wherein said gas-phase corrosion inhibiting composition comprises inorganic compounds.

16. The method of claim 11, wherein said gas-phase corrosion inhibiting composition is combined with said second component prior to combining said second component with said first component.

\* \* \* \* \*